US012599906B2

(12) United States Patent
Wraber

(10) Patent No.: US 12,599,906 B2
(45) Date of Patent: Apr. 14, 2026

(54) CONTAINER FOR SMALL LIQUID VOLUMES

(71) Applicant: DSM AUSTRIA GMBH, Getzersdorf bei Traismauer (AT)

(72) Inventor: Martin Wraber, Copenhagen (DK)

(73) Assignee: DSM IP ASSETS B.V., Maastricht (NL)

( * ) Notice: Subject to any disclaimer, the term of this patent is extended or adjusted under 35 U.S.C. 154(b) by 652 days.

(21) Appl. No.: 18/012,091

(22) PCT Filed: Jun. 22, 2021

(86) PCT No.: PCT/EP2021/066931
§ 371 (c)(1),
(2) Date: Dec. 21, 2022

(87) PCT Pub. No.: WO2022/002682
PCT Pub. Date: Jan. 6, 2022

(65) Prior Publication Data

US 2023/0234062 A1 Jul. 27, 2023

(30) Foreign Application Priority Data

Jun. 29, 2020 (EP) .................................... 20182943

(51) Int. Cl.
*B01L 99/00* (2010.01)
*B01L 3/00* (2006.01)

(52) U.S. Cl.
CPC ............ *B01L 3/5029* (2013.01); *B01L 3/563* (2013.01); *B01L 2200/026* (2013.01);
(Continued)

(58) Field of Classification Search
None
See application file for complete search history.

(56) References Cited

U.S. PATENT DOCUMENTS 4,091,802 A 5/1978 Columbus
6,277,646 B1 * 8/2001 Guirguis ................. B01L 3/502 422/417

(Continued)

FOREIGN PATENT DOCUMENTS

CN 101356008 1/2009
CN 104470635 A 1/2015

(Continued)

OTHER PUBLICATIONS

International Search Report for PCT/EP2021/066931, mailed Sep. 24, 2021, 4 pages.

(Continued)

*Primary Examiner* — Paul S Hyun
(74) *Attorney, Agent, or Firm* — NIXON & VANDERHYE P.C.

(57) ABSTRACT

Containers for small liquid volumes have at least one inlet chamber, at least one outlet chamber, an open top end and a bottom end which includes at least one access region. At least one inlet chamber is capable of accommodating a swab stick and is provided with at least one open top end and is connectable to at least a first free end of a flowpath via the at least one access region. The at least one outlet chamber has at least one open top end and is connectable to at least another free end of the flowpath via the at least one access region. A kit, an interface for fluid handling, and a method for analyzing a sample liquid are also provided.

16 Claims, 3 Drawing Sheets

(52) U.S. Cl.
CPC . *B01L 2300/044* (2013.01); *B01L 2300/0672* (2013.01); *B01L 2300/0832* (2013.01); *B01L 2300/0851* (2013.01)

(56) References Cited

U.S. PATENT DOCUMENTS

| | | | |
|---|---|---|---|
| 10,099,217 | B2 | 10/2018 | Kirschhoffer et al. |
| 10,139,322 | B2 | 11/2018 | Olivier et al. |
| 10,293,338 | B2 | 5/2019 | Foucault |
| 10,675,628 | B2 | 6/2020 | Olivier et al. |
| 2009/0155923 | A1 | 6/2009 | Bonecker |
| 2015/0153257 | A1 | 6/2015 | Oliver et al. |
| 2015/0276573 | A1 | 10/2015 | Buzatu et al. |
| 2016/0250630 | A1 | 9/2016 | Foucault |

FOREIGN PATENT DOCUMENTS

| | | | |
|---|---|---|---|
| CN | 104470635 | | 3/2015 |
| CN | 108136398 | A | 10/2015 |
| CN | 105722595 | | 6/2016 |
| CN | 105813749 | | 7/2016 |
| CN | 106457242 | | 2/2017 |
| DE | 10 2012 024 353 | | 6/2014 |
| EP | 3 126 050 | | 2/2017 |
| WO | 99/38996 | | 8/1999 |
| WO | 2004/086979 | | 10/2004 |
| WO | 2005/049809 | | 6/2005 |
| WO | 2019/025613 | | 2/2019 |

OTHER PUBLICATIONS

Written Opinion of the ISA for PCT/EP2021/066931, mailed Sep. 24, 2021, 5 pages.

* cited by examiner

CONTAINER FOR SMALL LIQUID VOLUMES

This application is the U.S. national phase of International Application No. PCT/EP2021/066931 filed Jun. 22, 2021, which designated the U.S. and claims priority to EP Patent Application No. 20182943.9 filed Jun. 29, 2020, the entire contents of each of which are hereby incorporated by reference.

The present invention relates to a container, a kit, an interface for fluid handling, a method for analyzing a sample liquid, and a use of the container.

Handling of liquid samples, such as liquids comprising biological material, bears the inherent requirement for a sample vessel or a container wherein the sample is held until further use. To perform any kind of work or analysis with or on said held liquid sample, it is often inevitable to transfer the liquid sample from one container to another container or to a further device e.g. to a distinct reaction tube, to a mixing device or to an analyzer instrument comprising an analysis unit.

However, whenever work is performed with a liquid sample a number of risks arises such as the risk for a loss of at least parts of the sample volume, e.g. by spillage, resulting in poor reproducibility of an analysis performed on the liquid sample. Furthermore, the step of transferring or transporting a liquid sample is typically associated with considerable loss in process speed and thus a loss in process efficiency. Yet another risk associated with liquid transfer is the risk for leakage of the liquid into an instrument, causing damage e.g. to the electronics of the instrument.

In particular when working with harsh or unstable chemicals, biomolecules such as nucleic acids or proteins, or microbes, a fast, safe and spillage-free transfer of a sample liquid from one container into another or into an analyzer instrument is crucial.

Even more challenging, once a sample liquid has been transferred successfully from a first container into a second container, e.g. an analyzer instrument, and once it was further processed therein, e.g. analyzed, it becomes necessary to remove the sample from the analyzer instrument, so that the analyzer instrument as well as the flowpath leading there remain clean and become available for analyzing the next sample.

In the field of hygiene monitoring, surfaces are tested for microbial contamination. To this end, swab sticks are commonly used to wipe across a surface to collect samples, which are subsequently transferred into a liquid, which liquid is then analyzed to determine the absence or presence of microbes. Inherently, comparatively small amounts of liquids have to be handled in this field, and spillage- and leakage-free handling is of particular importance.

One approach to analyze microbes collected from a surface is to determine the colony forming units (CFUs), i.e. the amount of cells capable of multiplying and forming cell colonies. This method relies on the prerequisite that the collected cells are indeed capable of growing on the provided growth media. Another disadvantage of CFU determination is the time required for the microbes to form colonies that are visible to the experimenter. Depending on the microbial species, the time frame to be expected for a result is rather days than hours.

Alternatively, a number of test systems nowadays relies on the indirect determination of a biological material by screening for the availability of the molecule adenosine triphosphate (ATP). This molecule is produced by cells in order to provide energy to numerous biological processes.

As a consequence, ATP is a reliable indicator for the at least transient presence of a living cell at a certain location. Due to the indirect methodological concept a discrimination between dead cells and living cells cannot be made, since a detected ATP may stem from either dead or a living cell. Moreover, due to the widespread prevalence of ATP throughout essentially all taxa of living cells, it is not possible to distinguish whether the determined ATP stemmed e.g. from a eukaryotic organism, such as a human like the experimentor or a fungal cell, or from a bacterial cell. In contrast to the determination of CFUs, ATP testing is considerably faster since it is typically based on the enzymatic production of light by the rapid enzyme luciferase. However, it is an intrinsic disadvantage of chemical reactions, in particular of biochemical reactions that already small amounts of adverse molecules impose a severe bias on the results obtained from such reactions. In practice, traces of e.g. surface disinfectants can lead to the misinterpretation of the results obtained from an ATP test. Also, a sample subjected to an ATP test is contacted with the chemicals required for the test and is hereby compromised and cannot be used for further tests. Typical devices for ATP testings are therefore single-use only and are not designed to allow a recovery of a sample e.g. for additional analyses.

Commonly, a detecting reagent is separated from the unused sample-collecting device, such as a swab stick, by a penetrable membrane. Both, the detecting reagent and the swab stick are typically provided in a sealed cylindrical tube or vial. To analyse a sample, the tube is opened and the swab stick is used to collect a sample from a surface. Then, the sample-containing swab stick is re-inserted into the tube and used to penetrate the membrane to contact the sample with the detecting reagent.

WO99/38996 discloses a swab stick and a corresponding housing plus a suitable reagent for detecting ATP, wherein the reagent is contained in a chamber which is separated from the swab stick by a penetrable membrane.

WO 2004/086979 A1 relates to a swab stick with a tip covered in hydrophilic fibre, which covers the tip in the form of a layer applied by flocking.

WO 2005/049809 A1 relates to a method and an apparatus for detecting antibiotic substances by using growth inhibition of a microbial culture.

DE 10 2012 024 353 A1 discloses a container comprising multiple chambers separated by multiple membranes, which membranes can be penetrated by insertion of a swab stick. It is suggested to transfer a sample into a liquid comprised in a chamber of the container and to analyze the sample in the liquid by light-scattering measurements.

US 2015/0276573 A1 relates to flow cytometry methods for detecting microbes and discloses a swab kit for use in such methods, the kit comprising a housing comprising a swab stick, a filter and a collection unit.

In WO 2019/025613 A1, a microfluidic particle analysis device is disclosed suitable for rapid and direct determination of bacteria from a liquid sample, independent from cultivation of the collected microbes and from any chemical reaction. However, to date a convenient way to transfer the liquid sample from a container into the analysis device, followed by emptying of the flowpath comprised by the analysis device is not available.

To date, many flow cytometry instruments rely on single syringe systems which penetrate a membrane covering a sample within a container. However, these systems face several challenges, such as the demand for large volumes of sample liquid, and the lack of a suitable solution for cleaning the instrument and the associated liquid flowpath. As a consequence, such systems cannot be re-used immediately without an additional cleaning step or require a complicated architecture.

It is therefore an objective of the present invention to provide a container having a suitable architecture allowing a transfer of a liquid contained therein into another container or instrument such as an analyzing apparatus and returning the liquid back into the first container.

This objective is achieved by providing a container for small liquid volumes having at least one inlet chamber, at least one outlet chamber, an open top end and a bottom end, wherein the top end is optionally provided with a detachable lid element; wherein the bottom end comprises at least one access region; wherein the at least one inlet chamber is capable of accommodating a swab stick; wherein the at least one inlet chamber has at least one open top end and is connectable to at least a first free end of a flowpath via the at least one access region; and wherein the at least one outlet chamber has at least one open top end and is connectable to at least another free end of the flowpath via the at least one access region. By providing such a container it becomes advantageously possible to establish a flowpath for a sample liquid contained in the inlet chamber of the container from the container via connection to the at least first free end of the flowpath along the flowpath into another container such as an instrument (e.g. an analyzing apparatus or unit) and via the at least other free end of the flowpath back into the container albeit in the at least one outlet chamber. When using a container according to the present invention, a liquid contained therein can be accessed and processed from both the top end and the bottom end of the container. Hereby, for instance a sample can be introduced into a liquid contained in the inlet chamber via the open top end of the container and the open top end of the inlet chamber to form a sample liquid, which sample liquid can be sampled via the bottom end of the container. Transfers of liquid can be achieved e.g. by applying pressure or suction on one of the chambers of the container, thus transporting the liquid contained therein into a free end of a flowpath connected to said chamber. Via the flowpath, the liquid can then be further transported along the flowpath into the other chamber. By providing the outlet chamber with an open top end, back-pressure or even over-pressure can be avoided. Another non-limiting possibility to achieve transfer of liquid or fluid could be a pump system, pumping the liquid through the components of the container and the flowpath. A person having ordinary skill in the art is aware of alternative methods to achieve liquid transfer through a flowpath. Once the fluid level of the sample liquid is below an opening of a free end of a flowpath, gas (e.g. air) is introduced into the flowpath via the free end when a flow is applied. This introduced gas displaces essentially all liquid contained in the flowpath, until the gas exits the flowpath through the other free end. Ultimately, both free ends and the entire flowpath from the first free end to the other free end is essentially emptied from sample liquid. A container for small liquid volumes as referred to herein, can be e.g. a sample tube or sample vessel, basically any container or receptacle suitable for containing a liquid, preferably a liquid containing biological material, in particular biological cells. Accordingly, small liquid volumes as used herein refer to liquid volumes in the milliliter range, preferably less than 100 mL, more preferably less than 50 mL, even more preferably less than 15 mL, most preferably less than 5 mL. It is further considered, that the detachable lid element may comprise a fixating structure, such as a clamp structure, wherein the fixating structure is preferably capable of fixating a swab stick. Therefore, a container for small liquid volumes as referred to herein may comprise a detachable lid element comprising a fixating structure, preferably a clamp structure, and a swab stick, wherein the swab stick is fixed to the detachable lid element by the fixating structure. In an embodiment, a container as described above is provided, wherein the at least one inlet chamber and the at least one outlet chamber are provided adjacently to one another; and preferably, wherein the at least one inlet chamber and the at least one outlet chamber are vertically separated from one another.

In a further embodiment of the invention, a container is provided as described above, wherein the volume of the at least one outlet chamber is smaller than the volume of the at least one inlet chamber. Hereby, a fluid having essentially the volume of the at least one inlet chamber can be introduced into the inlet chamber and transported along the flowpath into the at least one outlet chamber without a risk for drying out of the at least one inlet chamber and in particular of a swab stick inserted therein. The fluid volume contained in the flowpath is typically small due to the small diameter of typical flowpath tubings. In case of a long flowpath that can hold more volume than the difference between the volume of the at least one inlet chamber and the at least one outlet chamber, it is preferred to provide a container as described above, wherein the combined volume of the at least one outlet chamber and of the flowpath is smaller than the volume of the at least one inlet chamber. It is considered that the volume of the at least one inlet chamber is at least 1.2 fold larger, such as at least 1.5 fold larger, or such as at least 1.7 fold larger, or such as at least 2 fold larger than the volume of the at least one outlet chamber, more preferably than the combined volume of the flowpath and the at least one outlet chamber. It is further considered that emptying of the outlet chamber can be achieved in a quicker manner when the volume of the fluid to be emptied from the outlet chamber is small. The volume of the fluid to be emptied from the outlet chamber depends on the position of the opening of the free end of the flowpath in the outlet chamber as well as on the geometry of the outlet chamber. Any fluid volume above the level of the opening of the free end of the flowpath is a fluid to be removed from the outlet chamber. As soon as a fluid level in the outlet chamber sinks below the opening of the free end of the flowpath, this fluid is not a fluid to be emptied from the outlet chamber, since it is not possible to transfer this fluid into the opening of the free end of the flowpath.

In a further embodiment of the invention, a container as described above is provided in a way, wherein the at least one outlet chamber is arranged in fluid connection with the at least one inlet chamber via the at least one open top end of the at least one outlet chamber. This fluid connection via the at least one open top end of the at least one outlet chamber is arranged in a way, wherein the fluid direction from the at least one outlet chamber into the at least one inlet chamber via the at least one open top end of the at least one outlet chamber is essentially mondirectional, wherein fluid can be transferred from the at least one outlet chamber to the at least one inlet chamber but not vice versa. Preferably, a fluid exceeding the volume of the at least one outlet chamber can flow or can be transported into the at least one inlet chamber via the at least one open top end of the at least one outlet chamber. This embodiment allows a transfer of a sample liquid contained in the inlet chamber of the container via the first free end of the flowpath e.g. into an analysis apparatus wherein the sample liquid is analyzed, e.g. by means of flow cytometry. Once the sample has passed the analyzing component of the analysis apparatus, it may be further transferred into the outlet chamber of the container via the second free end of the flowpath. By providing a container as described above, wherein the volume of the outlet chamber is smaller than the volume of the at least one inlet chamber; and wherein the at least one outlet chamber is arranged in fluid connection with the at least one inlet chamber via the at least one open top end of the at least one outlet chamber, all sample liquid exceeding the volume of the outlet chamber can flow into the inlet chamber and can thus be recirculated directly into the inlet chamber. From the inlet chamber, the recirculated sample liquid can be transported again into the analysis apparatus via the flowpath. Hereby, analysis of one sample liquid can be operated in continuous flow mode, thus improving the accuracy of the analysis. In addition it is possible to empty the entire flowpath between the free ends of the flowpath by reversing the flow direction and thus transporting all fluid to be emptied from the outlet chamber via the free end of the flowpath connected to the outlet chamber along the flowpath and further via the free end of the flowpath connected to the inlet chamber back into the inlet chamber. Hereby, the flowpath can be emptied essentially entirely once the sample liquid has been sufficiently analyzed. It is considered that such a flowpath may be an external flowpath that might connect a container as described herein with at least one other container and/or analysis instrument, or such a flowpath may be comprised in another container, e.g. in an analyzer instrument such as the microfluidic particle analysis device disclosed in WO 2019/025613 A1.

In another embodiment of the invention, the at least one open top end of the at least one outlet chamber providing fluid connection between the at least one outlet chamber and the at least one inlet chamber as described above, is partly covered or restricted by a covering element. Hereby, premature spillage of sample liquid into the outlet chamber can be minimized, and the majority of fluid is contained in the inlet chamber at least until a flow is initiated.

In a further embodiment, a container as described herein is provided, wherein the at least one access region is at least one septum; wherein the at least one inlet chamber is accessible by an at least first free end of a flowpath through the at least one septum when the at least first free end of the flowpath is at least a first hollow needle; wherein the at least one outlet chamber is accessible by at least another free end of the flowpath through the at least one septum, when the at least other free end of the flowpath is at least another hollow needle; and wherein the at least first hollow needle is connectable with the at least other hollow needle to establish a fluid connection between the at least first hollow needle and the at least other hollow needle via the flowpath. Such a container wherein the access region is at least one septum, penetrable by at least a first and another hollow needle into the at least one inlet chamber and the at least one outlet chamber, respectively, allows for a connection of the at least one inlet chamber and the at least one outlet chamber of the container with the flowpath via the at least two hollow needles. In another embodiment, the outer diameter of the at least first hollow needle and the at least other hollow needle is at most 0.5 cm, such as at most 0.3 cm, or such as at most 0.2 cm, or such as at most 0.15 cm. By using hollow needles having a preferably small outer diameter, damaging of the septum upon penetration with such hollow needles is minimized.

A septum as referred to herein may also be referred to by synonymous names known to a person having skill in the art, such as e.g. membrane or diaphragm. Also encompassed are all elements having essentially the same function as a septum as described herein, i.e. in particular elements that provide a possibility for connecting a flowpath to a container or a chamber of a container. It is considered that a container according to the present invention may comprise not only one access region, in particular a septum, covering the at least one inlet chamber and the at least one outlet chamber, but may also comprise two or more access regions, wherein e.g. a first septum covers the at least one inlet chamber and a second septum covers the at least one outlet chamber.

In another embodiment of the invention, the container described herein is provided in a way, wherein the at least one outlet chamber comprises an outer wall of the outlet chamber, and an inner wall of the outlet chamber; wherein the at least one inlet chamber comprises an outer wall of the inlet chamber, and an inner wall of the inlet chamber; wherein the at least one inlet chamber is at least partly surrounded by the at least one outlet chamber; wherein the at least one inlet chamber is formed by the inner wall of the inlet chamber and at least a part of the bottom end; and wherein the at least one outlet chamber is formed by the inner wall of the outlet chamber, at least a part of the outer wall of the inlet chamber and at least a part of the bottom end. A container having such an architecture was found to be particularly advantageous in terms of producibility as well as for connectability to a flowpath, e.g. by connecting the container to the flowpath via hollow needles as described herein. Hereby, a container is provided as described above, wherein a distance between the outer wall of the at least one inlet chamber and the outer wall of the at least one outlet chamber is at least 0.1 mm, such as at least 0.2 mm, or such as at least 0.3 mm, or such as at least 0.4 mm. It is considered that said distance between the outer wall of the at least one inlet chamber and the outer wall of the at least one outlet chamber may be realized consistently or partially. In an embodiment, wherein the distance is realized partially, the distance between the outer wall of the at least one inlet chamber and the outer wall of the at least one outlet chamber can be partially smaller than 0.1 mm except for at least one channel structure, wherein the distance between the outer wall of the at least one inlet chamber and the outer wall of the at least one outlet chamber in said channel structure is at least is at least 0.1 mm, such as at least 0.2 mm, or such as at least 0.3 mm, or such as at least 0.4 mm. Hereby, retention of a fluid due to capillarity can be avoided and efficient emptying of the outlet chamber can be achieved via the flowpath. The present invention also relates to a container as described herein, wherein the at least one inlet chamber is capable of accommodating a swab stick. A swab stick as referred to herein relates e.g. to swab sticks which are used in the field of hygiene monitoring. By providing a container, wherein the inlet chamber is capable of accommodating a swab stick, samples taken up by such a swab stick can be transferred directly and most conveniently into a liquid contained in the inlet chamber. Further, the container comprising the inlet chamber being capable of accommodating a swab stick is provided in a way, wherein a swab stick cannot contact the at least first free end of the flowpath. Hereby, clogging of the flowpath by the swab stick or e.g. a sample component adsorbed on the swab stick can be avoided. At the same time, full immersion of at least the sample-collecting part of the swab stick into a liquid contained in the at least one inlet chamber is necessary.

In addition, a container as described herein may be provided, wherein the container comprises at least one bottom element, wherein the at least one bottom element partly covers the access region, preferably a septum. It was found that such an additional bottom element partly covering the access region, preferably a septum leads to a stabilization of the access region, thereby increasing durability of the at least one access region and easing penetration with hollow needles in case the access region is a septum. Preferably, the bottom element comprises at least two passage ways. Hereby, insertion of hollow needles can be guided for reliable and easy penetration of the septum into the inlet and outlet chamber(s) of the container.

Also, it is considered that a container as described herein is provided, wherein the at least one inlet chamber is separated into at least a first inlet sub-chamber and at least a second inlet sub-chamber by at least one filter, wherein the at least second inlet sub-chamber is connectable to the at least first free end of the flowpath via the at least one access region. Hereby, it can be achieved that undesirable elements contained in the liquid, such as particles that could clog the flowpath, cannot enter the flowpath. Also, such particles may interfere with an analysis unit and thus result in erroneous measurements. The at least first inlet sub-chamber can directly receive a sample fluid, which sample fluid has to pass the at least one filter to enter the at least second inlet sub-chamber. Once the at least second inlet sub-chamber is connected with the at least first end of the flowpath, the thus filtered sample fluid can be transported into the flowpath.

Further, a container as described herein may be provided, wherein the container comprises at least one guiding element. Such a guiding element allows connecting the container with the free ends of the flowpath or an adapter or another container or instrument comprising the free ends of the flowpath in a certain, desired orientation. It is considered that the free ends of the flowpath or the adapter or the other container or instrument comprising the free ends of the flowpath comprises a counterpart fitting to the guiding element. In particular, it is considered that the guiding element and the counterpart fit together analogous e.g. to two puzzle pieces. The guiding element can be e.g. a recess structure or a notch structure. In such a case, the counterpart fitting to the guiding element would be a protruding element fitting into the recess or notch structure. Vice versa, the guiding element can also be a protruding element such as a nose structure, in which case the counterpart would be a recess or notch structure.

Whenever two or more parts are considered to be connected with one another to form a system executing a desired function, a maximum of compatibility is desired. Therefore, it is another objective of the present invention to provide a kit wherein the individual parts are designed for optimal compatibility.

This objective was achieved by providing a kit comprising a container as described herein, an analysis unit, and means for establishing a fluid connection from the at least one inlet chamber to the at least one outlet chamber via the analysis unit. In a further embodiment, a kit as described herein is provided, wherein the means for establishing a fluid connection from the at least one inlet chamber to the at least one outlet chamber via the analysis unit comprise the at least first hollow needle, the at least other hollow needle and the flowpath.

In a further embodiment, the kit described herein additionally comprises a swab stick. In yet another embodiment, the kit described herein additionally comprises a fluid and/or at least one buffer component. The fluid may be any liquid suitable for containing a biological sample, such as water or liquid buffer. The at least one buffer component may be a buffer salt. Upon addition of a liquid, e.g. water, the buffer salt can dissolve and serve as a buffered liquid suitable for containing a biological sample.

It is considered, that in an embodiment of the invention, a kit is provided, wherein the means for establishing a fluid connection from the at least one inlet chamber to the at least one outlet chamber via the analysis unit are comprised by the analysis unit. Hereby, essentially all parts of the means for establishing a fluid connection from the at least one inlet chamber to the at least one outlet chamber via the analysis unit along the flowpath are parts of the analysis unit, which are provided as predominantly internal parts of the analysis unit. In such an embodiment, handling convenience was found to be maximized. The only external parts of the means for establishing a fluid connection from the at least one inlet chamber to the at least one outlet chamber via the analysis unit are the free ends of the flowpath, e.g. hollow needles, via which free ends of the flowpath a connection between the container and the analysis unit can be easily established.

In another aspect, the present invention relates to an interface comprising a fluid container and a flowpath, comprising at least one inlet chamber, at least one outlet chamber, a top end, a bottom end, at least a first free end of a flowpath, and at least another free end of the flowpath, wherein the bottom end comprises at least one access region; wherein the at least one inlet chamber is capable of accommodating a swab stick; wherein the at least one inlet chamber has at least one open top end and is connectable to the at least a first free end of the flowpath via the at least one access region; and wherein the at least one outlet chamber has at least one open top end and is connectable to the at least other free end of the flowpath via the at least one access region. By providing such an interface, it was surprisingly found that a fluid can be transported from an inlet chamber comprised in a first container, via a flowpath and preferably a second container or analysis unit or instrument into an outlet chamber comprised in the first container, and back into the inlet chamber. Handling or transporting a fluid via such an interface can be performed without spillage or leakage of the fluid. A fluid as referred to herein can be a liquid such as e.g. an aqueous solution, a suspension or an oil or a gas. Preferably, the fluid is a liquid containing sample material, preferably biological material such as biological cells.

In another embodiment, the interface as described herein is provided in a way, wherein the volume of the at least one outlet chamber is smaller than the volume of the at least one inlet chamber. Hereby, a fluid volume corresponding to the volume of the at least one inlet chamber can be introduced into the inlet chamber and transported along the flowpath into the at least one outlet chamber without a risk for drying out of the at least one inlet chamber. In case of a long flowpath that can hold more volume than the difference between the volume of the at least one inlet chamber and of the at least one outlet chamber, it is preferred to provide an interface as described above, wherein the combined volume of the at least one outlet chamber and the flowpath is smaller than the volume of the at least one inlet chamber.

The invention further relates to an interface as described herein, wherein the at least one outlet chamber is arranged in fluid connection with the at least one inlet chamber via the at least one open top end of the at least one outlet chamber. By providing such an interface, any fluid volume exceeding the volume of the outlet chamber may be recirculated directly into the inlet chamber and optionally further re-entered into the flowpath via the first free end of the flowpath.

In another embodiment, the present invention relates to an interface as described herein, wherein the at least one access region is at least one septum; wherein the at least first free end of the flowpath is at least a first hollow needle; wherein the at least other free end of the flowpath is at least another hollow needle; wherein the at least one inlet chamber is accessible by the at least first hollow needle through the at least one septum; wherein the at least one outlet chamber is accessible by the at least other hollow needle through the at least one septum; and wherein the at least first hollow needle is connectable with the at least other hollow needle to establish a fluid connection between the at least first hollow needle and the at least other hollow needle via the flowpath. Such an interface allows easy and convenient connection of a container as described herein with a flowpath and e.g. an analysis instrument. For instance a sample liquid to be analysed can be provided in a container as described herein, connected via an interface as described herein with a flowpath and an analysis unit, analysed by the analysis unit, and returned essentially entirely to the container while leaving the flowpath, in particular the analysis unit essentially empty and thus ready for the next analysis. To allow at least almost entire emptying of the outlet chamber through the free end of the flowpath connected with the outlet chamber, it is advisable that the opening of the free end is positioned in proximity to the septum.

An alternative solution to allow emptying of a flowpath would be to provide a container or an interface comprising only one chamber and two needles, wherein one of the two needles is so much longer than the other one that it sticks out above the surface level of a sample fluid introduced into said chamber. Via such a long needle, again gas could be transported into the flowpath to displace sample fluid. However, long needles are easily bent, in particular when they are used repeatedly. Stabilization of such long needles by increasing their diameter bears the limitation that a needle having a large diameter might damage the septum, resulting in leakage. In another embodiment, an interface is thus provided, wherein the outer diameter of the at least first hollow needle and the at least other hollow needle is at most 0.5 cm, such as at most 0.3 cm, or such as at most 0.2 cm, or such as at most 0.15 cm.

Whenever a sample is contained in a liquid to form a sample liquid, which sample liquid is contained in a container and which sample liquid needs to be analyzed outside of said container, e.g. in an analysis unit, a fast and ideally lossless transport from the container to the analysis unit is required. Particularly in applications where more than one sample liquid needs to be analyzed in the analysis unit, it is desirable to establish a workflow that allows rapid analysis of one sample liquid after the other.

This objective was achieved by the present invention by providing a method for analyzing a sample liquid contained in a container for small liquid volumes in at least one analysis unit; wherein the container for small liquid volumes comprises at least one inlet chamber, at least one outlet chamber, a top end and a bottom end, wherein the bottom end comprises at least one access region, wherein the at least one inlet chamber has at least one open top end and is connectable to at least a first free end of a flowpath via the at least one access region, and wherein the at least one outlet chamber has at least one open top end and is connectable to at least another free end of the flowpath via the at least one access region; comprising the steps of a) transporting the sample liquid from the at least one inlet chamber through the at least first free end of the flowpath along the flowpath to the at least one analysis unit; b) performing at least one analysis of the sample liquid in the at least one analysis unit; c) transporting the sample liquid from the at least one analysis unit further along the flowpath through the at least other free end of the flowpath to the at least one outlet chamber; d) optionally, recirculating the sample liquid from the at least one outlet chamber to the at least one inlet chamber and repeating the previous steps; g) returning at least one result from the analysis of the sample liquid. It was found that by applying such a method, a sample liquid contained in a first container can be transported to and analyzed in an analysis unit as well as transported back into the first container essentially loss free. It is possible to recirculate the same sample liquid from the outlet chamber back into the inlet chamber, from where it can be transported again to the analysis unit as described in step d). Preferably, step d) is performed by recirculating the sample liquid directly from the at least one outlet chamber to the at least one inlet chamber via the at least one open top end of the at least one outlet chamber connecting the at least one outlet chamber with the at least one inlet chamber, i.e. without passing the analysis unit, and repeating the previous steps. Thus, a sample liquid can be analysed basically in continuous-flow-mode, whereby the analysis accuracy can be improved. To this end, the invention therefore further relates in particular to a method, by providing at least one outlet chamber having a volume smaller than the volume of the at least one inlet chamber; and by arranging the at least one outlet chamber in fluid connection with the at least one inlet chamber via the at least one open top end of the at least one outlet chamber. An analysis unit as described herein can be e.g. comprised in a second container or apparatus or instrument. It is also considered that several analysis units can be provided, serially and/or in parallel, along the flowpath. An analysis unit or an instrument or apparatus comprising an analysis unit as referred to herein can be, but not limited to, e.g. a flow cell equipped with a detector such as e.g an optical detector, a flow cytometer, a particle analyzer etc.

The present invention further relates to a method for analyzing a sample liquid contained in a container for small liquid volumes as described herein in at least one analysis unit; wherein the container for small liquid volumes comprises at least one inlet chamber, at least one outlet chamber, a top end and a bottom end, wherein the bottom end comprises at least one access region, wherein the at least one inlet chamber has at least one open top end and is connectable to at least a first free end of a flowpath via the at least one access region, and wherein the at least one outlet chamber has at least one open top end and is connectable to at least another free end of the flowpath via the at least one access region; comprising the steps of a) transporting the sample liquid from the at least one inlet chamber through the at least first free end of the flowpath along the flowpath to the at least one analysis unit; b) performing at least one analysis of the sample liquid in the at least one analysis unit; c) transporting the sample liquid from the at least one analysis unit further along the flowpath through the at least other free end of the flowpath to the at least one outlet chamber; d) optionally, recirculating the sample liquid from the at least one outlet chamber to the at least one inlet chamber and repeating the previous steps; g) returning at least one result from the analysis of the sample liquid; and further comprising the steps of e) transporting the sample liquid from the at least one outlet chamber through the at least other free end of the flowpath along the flowpath via the at least one analysis unit and further along the flowpath through the at least first free end of the flowpath to the at least one inlet chamber; f) transporting a gas from the at least one outlet chamber through the at least other free end of the flowpath along the flowpath via the at least one analysis unit and further along the flowpath through the at least first free end of the flowpath to the at least one inlet chamber, thereby displacing the sample liquid from the flowpath with the gas. Hereby, it was surprisingly found that the sample liquid could be returned essentially entirely into the first container, while the flowpath and the at least one analysis unit were essentially emptied. As a consequence, another sample liquid can be analyzed subsequently via the same method without a need for additional cleaning steps to be performed on the flowpath or the analysis unit. The transport of a liquid may be achieved e.g. by pumping, suction or pressure. It was found that by providing a method for analyzing a sample liquid according to the present invention that allows efficient emptying of the flowpath as described herein, the carry-over from a first sample liquid to be analyzed to a second sample liquid to be analyzed is sufficiently low without the necessity for additional cleaning. It was found that the analyte carry-over without performing steps e) and f) of the method for analyzing a sample liquid contained in a first container as described herein in at least one analysis unit as described above is at least 20% of the analyte. For instance, assuming a first sample liquid contained 100 analyte units and a second sample liquid contained 0 analyte units, 100 analyte units would be correctly determined from the first sample liquid, but 20 analyte units would be incorrectly determined for the second sample liquid, due to a 20% analyte carry over from the measurement of the first ample liquid to the measurement of the second sample liquid caused by omission of steps e) and f). In contrast, performing steps e) and f) led to an analyte carry-over below 5% or even below 2%. Therefore, a method for analyzing a sample liquid contained in a first container according to the present invention can be carried out such that the analyte carry-over between a first sample liquid and a second sample liquid is below 5%, such as below 2%, or such as below 1%, without additional cleaning step.

According to another embodiment, a method for analyzing a sample liquid contained in a container for small liquid volumes as described herein is provided, wherein the volume of the at least one outlet chamber is smaller than the volume of the at least one inlet chamber; and wherein the at least one outlet chamber is arranged in fluid connection with the at least one inlet chamber via the at least one open top end of the at least one outlet chamber. In another embodiment of the present invention, a method for analyzing a sample liquid contained in a container for small liquid volumes as described herein is provided; wherein the at least first free end of the flowpath is at least a first hollow needle; wherein the at least other free end of the flowpath is at least another hollow needle; wherein the at least one access region is at least one septum; wherein the at least one inlet chamber is accessible by the at least first hollow needle through the at least one septum; wherein the at least one outlet chamber is accessible by the at least other hollow needle through the at least one septum; and wherein the at least first hollow needle is connectable with the at least another hollow needle to establish a fluid connection between the at least first hollow needle and the at least other hollow needle via the flowpath. Hereby, the method can be performed most conveniently, since a connection of the inlet chamber and the outlet chamber of the container with the flowpath can be easily established by penetration of the septum with the needles. A transport of a liquid in a method as described herein can be achieved e.g. by a pump system. The flow direction of a liquid can be chosen by defining a corresponding pump system. Transporting of a liquid such as sample liquid and/or gas can be achieved by applying e.g. suction pressure or applied pressure. A liquid can be transported from the inlet chamber along the flowpath to the outlet chamber by establishing a first flow direction. And the liquid can be transported back from the outlet chamber along the flowpath to the inlet chamber by reversal of the flow direction, i.e. by applying a second flow direction, which is the opposite direction of the first flow direction. Further, it is considered that an optional recirculation of the liquid from the at least one outlet chamber to the inlet chamber as referred to in step d) above, may be achieved e.g by providing the outlet chamber in a manner, wherein a fluid connection between the outlet chamber and the inlet chamber via the at least one open top end of the at least one outlet chamber is provided. Preferably, this fluid connection is achieved by providing an outlet chamber, wherein the outlet chamber has a volume smaller than the volume of the inlet chamber and wherein any liquid having a volume exceeding the volume of the outlet chamber flows or is transported into the inlet chamber.

In particular, such a method for analyzing a sample liquid contained in a container as described herein, is applied in the field of hygiene monitoring as a method for analyzing surface hygiene. In such a method for analyzing surface hygiene, a sample is taken from a surface, e.g. by using a swab stick or any other suitable means for the purpose of taking up a sample from a surface; by transferring the sample into a suitable liquid a sample liquid is provided, which sample liquid is transferred into a container according to the present invention and analyzed in a method as described herein. Alternatively, the sample liquid can be provided by transferring the sample into the suitable liquid, wherein the suitable liquid is provided in the container, in particular in the at least one inlet chamber of the container according to the present invention.

It is an advantage of the method for analyzing a sample liquid contained in a container as described herein in an analysis unit that after analysis said container can be emptied and refilled with another sample liquid to be analyzed. Thus it is envisaged that the container is reusable. Also or alternatively, once a sample liquid has been analyzed according to the method according to the present invention in a first analysis and returned to the container, the same sample liquid can be analyzed in another analysis unit by repeating the method of the present invention with said other analysis unit.

The present invention and specific embodiments thereof are further characterized by the following items:

1. Container for small liquid volumes having at least one inlet chamber, at least one outlet chamber, an open top end and a bottom end, wherein the top end is provided with a detachable lid element; wherein the bottom end comprises at least one access region; wherein the at least one inlet chamber has at least one open top end and is connectable to at least a first free end of a flowpath via the at least one access region; and wherein the at least one outlet chamber has at least one open top end and is connectable to at least another free end of the flowpath via the at least one access region.

2. Container according to item 1, wherein the volume of the at least one outlet chamber is smaller than the volume of the at least one inlet chamber.

3. Container according to item 2, wherein the volume of the at least one inlet chamber is at least 1.2 fold larger, such as at least 1.5 fold larger, or such as at least 1.7 fold larger, or such as at least 2 fold larger than the volume of the at least one outlet chamber.

4. Container according to any one of items 2 and 3, wherein the at least one outlet chamber is arranged in fluid connection with the at least one inlet chamber via the at least one open top end of the at least one outlet chamber.

5. Container according to item 4, wherein the size of the at least one open top end of the at least one outlet chamber is partly restricted by a covering element.

6. Container according to any one of items 1 to 5, wherein the at least one access region is at least one septum; wherein the at least first free end of the flowpath is at least a first hollow needle; wherein the at least other free end of the flowpath is at least another hollow needle; wherein the at least one inlet chamber is accessible by the at least first hollow needle through the at least one septum; wherein the at least one outlet chamber is accessible by the at least other hollow needle through the at least one septum; and wherein the at least first hollow needle is connectable with the at least other hollow needle to establish a fluid connection between the at least first hollow needle and the at least other hollow needle via the flowpath.

7. Container according to item 6, wherein the outer diameter of the at least first hollow needle and the at least other hollow needle is at most 0.5 cm, such as at most 0.3 cm, or such as at most 0.2 cm, or such as at most 0.15 cm.

8. Container according to any one of items 6 to 7, wherein the container further comprises at least one bottom element, wherein the at least one bottom element partly covers the septum.

9. Container according to item 8, wherein the at least one bottom element comprises at least two passage ways.

10. Container according to any one of items 1 to 9, wherein the container comprises at least one guiding element.

11. Container according to any one of items 1 to 10, wherein the at least one outlet chamber comprises an outer wall of the outlet chamber, and an inner wall of the outlet chamber; wherein the at least one inlet chamber comprises an outer wall of the inlet chamber, and an outer wall of the inlet chamber; wherein the at least one inlet chamber is at least partly surrounded by the at least one outlet chamber; wherein the at least one inlet chamber is formed by the inner wall of the inlet chamber and at least a part of the bottom end; and wherein the at least one outlet chamber is formed by the inner wall of the outlet chamber, at least a part of the outer wall of the inlet chamber and at least a part of the bottom end.

12. Container according to any one of items 1 to 11, wherein the at least one inlet chamber is separated into at least a first inlet sub-chamber and at least a second inlet sub-chamber by at least one filter element, wherein the at least second inlet sub-chamber is connectable to the at least first free end of the flowpath via the at least one access region.

13. Container according to any one of items 1 to 12, wherein the at least one inlet chamber is capable of accommodating a swab stick.

14. Container according to any one of items 1 to 13, wherein the container is a sample tube.

15. Kit comprising a container according to any one of items 1 to 14, an analysis unit, and means for establishing a fluid connection from the at least one inlet chamber to the at least one outlet chamber via the analysis unit.

16. Kit according to item 15, wherein the kit further comprises at least one swab stick.

17. Kit according to any one of items 15 and 16, wherein the kit further comprises at least one fluid or buffer component.

18. Kit according to any one of items 15 to 17, wherein the means for establishing a fluid connection from the at least one inlet chamber to the at least one outlet chamber via the analysis unit comprise the at least first hollow needle, the at least other hollow needle and the flowpath.

19. Kit according to any one of items 15 to 18, wherein the means for establishing a fluid connection from the at least one inlet chamber to the at least one outlet chamber via the analysis unit are comprised by the analysis unit.

20. Interface for fluid handling comprising at least one inlet chamber, at least one outlet chamber, a top end, a bottom end, at least a first free end of a flowpath, and at least another free end of the flowpath, wherein the bottom end comprises at least one access region; wherein the at least one inlet chamber has at least one open top end and is connectable to the at least a first free end of the flowpath via the at least one access region; and wherein the at least one outlet chamber has at least one open top end and is connectable to the at least other free end of the flowpath via the at least one access region.

21. The interface according to item 20, wherein the volume of the at least one outlet chamber is smaller than the volume of the at least one inlet chamber.

22. The interface according to item 21, wherein the at least one outlet chamber is arranged in fluid connection with the at least one inlet chamber via the at least one open top end of the at least one outlet chamber.

23. The interface according to any one of items 20 to 22, wherein the at least one inlet chamber is separated into at least a first inlet sub-chamber and at least a second inlet sub-chamber by at least one filter, wherein the at least second inlet sub-chamber is connectable to the at least first free end of the flowpath via the at least one access region.

24. The interface according to any one of items 20 to 23, wherein the at least one access region is at least one septum; wherein the at least first hollow needle is the at least first free end of the flowpath; wherein the at least other hollow needle is the at least other free end of the flowpath; wherein the at least one inlet chamber is accessible by the at least first hollow needle through the at least one septum; wherein the at least one outlet chamber is accessible by the at least other hollow needle through the at least one septum; and wherein the at least first hollow needle is connectable with the at least other hollow needle to establish a fluid connection between the at least first hollow needle and the at least other hollow needle via the flowpath.

25. The interface according to any one of items 20 to 24, wherein the at least one inlet chamber is capable of accommodating at least one swab stick.

26. Method for transporting a liquid, in particular for transporting small liquid volumes, from a first container to a second container and back to the first container, wherein the first container comprises at least one inlet chamber, at least one outlet chamber, a top end and a bottom end, wherein the bottom end comprises at least one access region, wherein the at least one inlet chamber has at least one open top end and is connectable to at least a first free end of a flowpath via the at least one access region, and wherein the at least one outlet chamber has at least one open top end and is connectable to at least another free end of the flowpath via the at least one access region; comprising the steps of a) transporting the liquid from the at least one inlet chamber through the at least first free end of the flowpath along the flowpath via the second container and through the at least other free end of the flowpath to the at least one outlet chamber; b) optionally, recirculating the liquid from the at least one outlet chamber directly to the at least one inlet chamber; c) transporting the liquid from the at least one outlet chamber through the at least other free end of the flowpath along the flowpath via the second container and through the at least first free end of the flowpath to the at least one inlet chamber; d) transporting a gas from the at least one outlet chamber through the at least other free end of the flowpath along the flowpath via the second container and through the at least first free end of the flowpath to the at least one inlet chamber, thereby displacing the liquid from the flowpath with the gas.

27. Method according to item 26, wherein the volume of the at least one outlet chamber is smaller than the volume of the at least one inlet chamber; and wherein the at least one outlet chamber is arranged in fluid connection with the at least one inlet chamber via the at least one open top end of the at least one outlet chamber.

28. Method according to any one of items 26 and 27, wherein the at least first free end of the flowpath is at least a first hollow needle; wherein the at least other free end of the flowpath is at least another hollow needle; and wherein the at least one access region is at least one septum; wherein the at least one inlet chamber is accessible by the at least first hollow needle through the at least one septum; wherein the at least one outlet chamber is accessible by the at least other hollow needle through the at least one septum; and wherein the at least first hollow needle is connectable with the at least another hollow needle to establish a fluid connection between the at least first hollow needle and the at least other hollow needle via the flowpath.

29. Method for analyzing a sample liquid contained in a first container according to any one of items 1 to 14 in at least one analysis unit; comprising the steps of a) transporting the sample liquid from the at least one inlet chamber through the at least first free end of the flowpath along the flowpath to the at least one analysis unit; b) performing at least one analysis of the sample liquid in the at least one analysis unit; c) transporting the sample liquid from the at least one analysis unit further along the flowpath through the at least other free end of the flowpath to the at least one outlet chamber; d) optionally, recirculating the sample liquid from the at least one outlet chamber to the at least one inlet chamber and repeating the previous steps; g) returning at least one result from the analysis of the sample liquid.

30. Method according to item 29, wherein the volume of the at least one outlet chamber is smaller than the volume of the at least one inlet chamber; and wherein the at least one outlet chamber is arranged in fluid connection with the at least one inlet chamber via the at least one open top end of the at least one outlet chamber.

31. Method according to any one of items 29 and 30, further comprising the steps of e) transporting the sample liquid from the at least one outlet chamber through the at least other free end of the flowpath along the flowpath via the analysis unit and further along the flowpath through the at least first free end of the flowpath to the at least one inlet chamber; and f) transporting a gas from the at least one outlet chamber through the at least other free end of the flowpath along the flowpath via the analysis unit and further along the flowpath through the at least first free end of the flowpath to the at least one inlet chamber, thereby displacing the sample liquid from the flowpath with the gas.

32. Method according to any one of items 29 to 31, wherein the at least first free end of the flowpath is at least a first hollow needle; wherein the at least other free end of the flowpath is at least another hollow needle; wherein the at least one access region is at least one septum; wherein the at least one inlet chamber is accessible by the at least first hollow needle through the at least one septum; wherein the at least one outlet chamber is accessible by the at least other hollow needle through the at least one septum; and wherein the at least first hollow needle is connectable with the at least another hollow needle to establish a fluid connection between the at least first hollow needle and the at least other hollow needle via the flowpath.

33. Method for analyzing surface hygiene comprising the steps of a) providing a container according to any one of items 1 to 14 and an analysis unit; b) taking a sample from a surface; c) providing a sample liquid by transferring the sample into a liquid in the at least one inlet chamber; d) transporting the sample liquid from the at least one inlet chamber through the at least first free end of the flowpath along the flowpath to the at least one analysis unit; e) performing at least one analysis of the sample liquid in the at least one analysis unit; f) transporting the sample liquid from the at least one analysis unit further along the flowpath through the at least other free end of the flowpath to the at least one outlet chamber; g) optionally, recirculating the sample liquid from the at least one outlet chamber to the at least one inlet chamber and repeating the previous steps; j) returning at least one result from the analysis of the sample liquid.

34. Method according to item 33, wherein the volume of the at least one outlet chamber is smaller than the volume of the at least one inlet chamber; and wherein the at least one outlet chamber is arranged in fluid connection with the at least one inlet chamber via the at least one open top end of the at least one outlet chamber.

35. Method according to any one of items 33 and 34, further comprising the steps of h) transporting the sample liquid from the at least one outlet chamber through the at least other free end of the flowpath along the flowpath via the analysis unit and further along the flowpath through the at least first free end of the flowpath to the at least one inlet chamber; and i) transporting a gas from the at least one outlet chamber through the at least other free end of the flowpath along the flowpath via the analysis unit and further along the flowpath through the at least first free end of the flowpath to the at least one inlet chamber, thereby displacing the sample liquid from the flowpath with the gas.

36. Method according to any one of items 33 to 35, wherein the at least first free end of the flowpath is at least a first hollow needle; wherein the at least other free end of the flowpath is at least another hollow needle; wherein the at least one access region is at least one septum; wherein the at least one inlet chamber is accessible by the at least first hollow needle through the at least one septum; wherein the at least one outlet chamber is accessible by the at least other hollow needle through the at least one septum; and wherein the at least first hollow needle is connectable with the at least another hollow needle to establish a fluid connection between the at least first hollow needle and the at least other hollow needle via the flowpath.

37. Use of a container according to any one of items 1 to 14 in a method according to any one of items 26 to 36.

38. Use of a container according to any one of items 1 to 14 in a method for determining the presence of biological cells comprised in a liquid.

In the following, the solution of the present invention is further described by non-limiting figures and examples.

DETAILED DESCRIPTION

The containers or schemes thereof comprising an interface according to the present invention shown in FIGS. 1-3 and described below serve merely as illustrative examples and are not to be construed as limiting embodiments of the present invention. The reference signs are used consistently for the indicated features.

Figure 1:
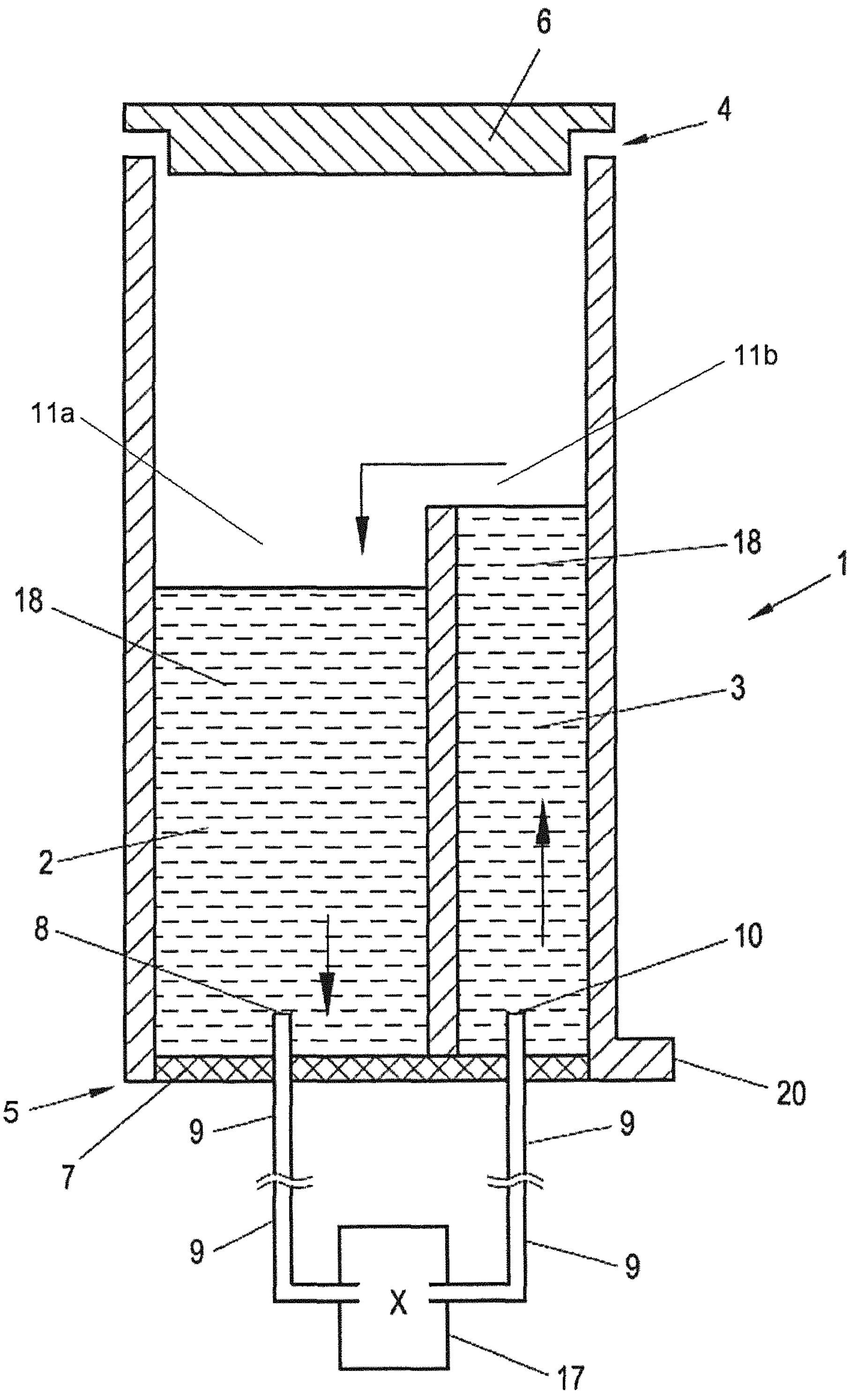
FIG. 1 is a longitudinal cross section of a container according to the present invention comprising an interface according to the present invention.

FIG. 1 is a longitudinal cross section of a schematic container 1 according to the present invention, comprising an inlet chamber 2 with an open top end 11*a*, an outlet chamber 3 with an open top end 11*b*, an open top end 4 of the container 1, a bottom end 5, an access region 7, a guiding element 20, and a detachable lid element 6. Also shown are a first free end 8 of a flowpath 9, the flowpath 9 comprising a second container 17, and a second free end 10 of the flowpath 9. In the embodiment of the container according to the present invention exemplarily shown in FIG. 1, the first free end 8 of the flowpath 9 is in fluid connection with the inlet chamber 2, and the second free end 10 of the flowpath 9 is in fluid connection with the outlet chamber 3. The flowpath 9 provides a fluid connection of the inlet chamber 2 via the first free end 8 and the outlet chamber 3 via the second free end 10 with a second container 17, which second container 17 is part of the flowpath 9 and can be e.g. an analysis unit.

Such a container 1 containing a sample liquid 18 allows transport of the sample liquid 18 from the inlet chamber 2 via the first free end 8 of the flowpath 9 along the flowpath 9 to a second container 17, which might be an analysis unit that allows performing of an analysis of the sample liquid 18, e.g. by transporting the sample liquid 18 through a flow cell comprised in said analysis unit. The sample liquid 18 can then be further transported along the flowpath 9 via the second free end 10 of the flowpath 9 into the outlet chamber 3. The flowpath leading through the second container 17, e.g. an analysis unit such as a flow cell, is considered a part of the flowpath 9.

By providing a container 1 comprising at least one access region 7 as exemplarily shown in FIG. 1, a particularly easy connection to a flowpath 9 as described herein can be achieved. An interface as referred to herein between a container 1 and a flowpath 9 as disclosed herein, was found to allow fast connection e.g. of sample vessels or containers containing a sample liquid to be analyzed by an analysis unit. The free ends 8, 10 of the flowpath 9 can be hollow needles and the at least one access region 7 can be at least one septum. Preferably, the free ends 8, 10 of the flowpath 9 are inserted in or connected to the inlet chamber 2 and the outlet chamber 3 in a way, wherein the open ends are close to the bottom of the inlet chamber 2 and the outlet chamber 3. Hereby, most of the sample liquid 18 contained in any of the chambers can be removed from the chambers e.g. by applying pressure. In such an embodiment of the present invention, it becomes possible e.g. to connect a first sample liquid contained in a first container via a flowpath to an analysis unit for analysis of the first sample liquid. After emptying of the flowpath 9, a second sample liquid contained in a second container can be directly connected to an analysis unit via the flowpath without an intermediate cleaning step, thus saving process time, in particular when a large number of analyses has to be performed. Notwithstanding, also a container containing e.g. a separate cleaning solution can be connected to the flowpath 9 for more intense cleaning of the flowpath 9 and/or the at least second container 17 which is also part of the flowpath 9. Due to the specific architecture of a container according to the present invention, also removal of the cleaning solution from the flowpath can be easily achieved. Also, the architecture of such a container allows the use of short needles as free ends 8, 10 of the flowpath 9 as connecting means, which short needles are less prone to damage by bending and can be reused many times, as well as to leakage upon penetration of a septum.

In the container 1 schematically shown in FIG. 1, the volume of the outlet chamber 3 is smaller than the volume of the inlet chamber 1. By continuing the flow from the inlet chamber 2 via the flowpath 9 to the outlet chamber 3, sample liquid 18 exceeding the volume of the outlet chamber 3 can recirculate through the open top end 11*b* of the outlet chamber 3 directly back into the inlet chamber 2. From the inlet chamber 2, this recirculated sample liquid 18 can re-enter the flowpath 9 via the first free end 8 of the flowpath 9 and may subsequently re-enter the second container 17 wherein the recirculated sample liquid 18 may be e.g. analyzed another time, thus increasing analysis accuracy.

To empty the flowpath 9 from the sample liquid 18, the flow direction can be reversed. Hereby, sample liquid 18 contained in the outlet chamber 3 can be transported via the second free end 10 of the flowpath 9 along the flowpath and ultimately via the first free end 8 of the flowpath 9 back into the inlet chamber 2. Once the level of the sample liquid 18 in the outlet chamber 3 sinks below the second free end 10 of the flowpath 9, no more sample liquid 18 can be introduced via the second free end 10 into the flowpath 9. By nevertheless continuing the flow, gas can be introduced from the outlet chamber 3 via the second free end 10 into the flowpath 9 and transported along the flowpath 9 until the gas is transported into the inlet chamber 2. Hereby, the gas will have displaced essentially the entire sample liquid 18 that was previously contained inter alia in the flowpath 9. As a consequence, the flowpath 9 can be connected with e.g. another container containing another sample fluid that is intended to be transported to the second container 17, e.g. for analysis.

To avoid spillage of the sample liquid 18 contained in the container 1 or to allow safe storage of the sample liquid 18, a detachable lid element 6 is suggested to be provided. It is considered that the detachable lid element 6 may be used when the container 1 is connected to the flowpath 9 as well as when the container 1 is not connected to the flowpath 9.

The container 1 schematically shown in FIG. 1 further comprises a guiding element 20. It is considered that the flowpath 9 may be arranged inside the second container 17, wherein essentially only the at least first free end 8 of the flowpath 9 and the at least other free end 10 of the flowpath 9 are directly accessible or even visible without disassembling the second container 17. To establish a connection of the flowpath 9 with the inlet chamber 2 and the outlet chamber 3 of the container 1, the first free end 8 of the flowpath 9 needs to be connected with the inlet chamber 2 and the second free end 10 of the flowpath 9 needs to be connected with the outlet chamber 3. To achieve these connections via the access region 7 of the container 1, it is desirable to guide the inlet chamber 2 to the first free end 8 and the outlet chamber 3 to the second free end 10 of the flowpath 9. A guiding element 20, which can be e.g. a nose structure or a recess or notch structure, that fits to a counterpart comprised by the second container 17 is considered to achieve this objective.

Figure 2:
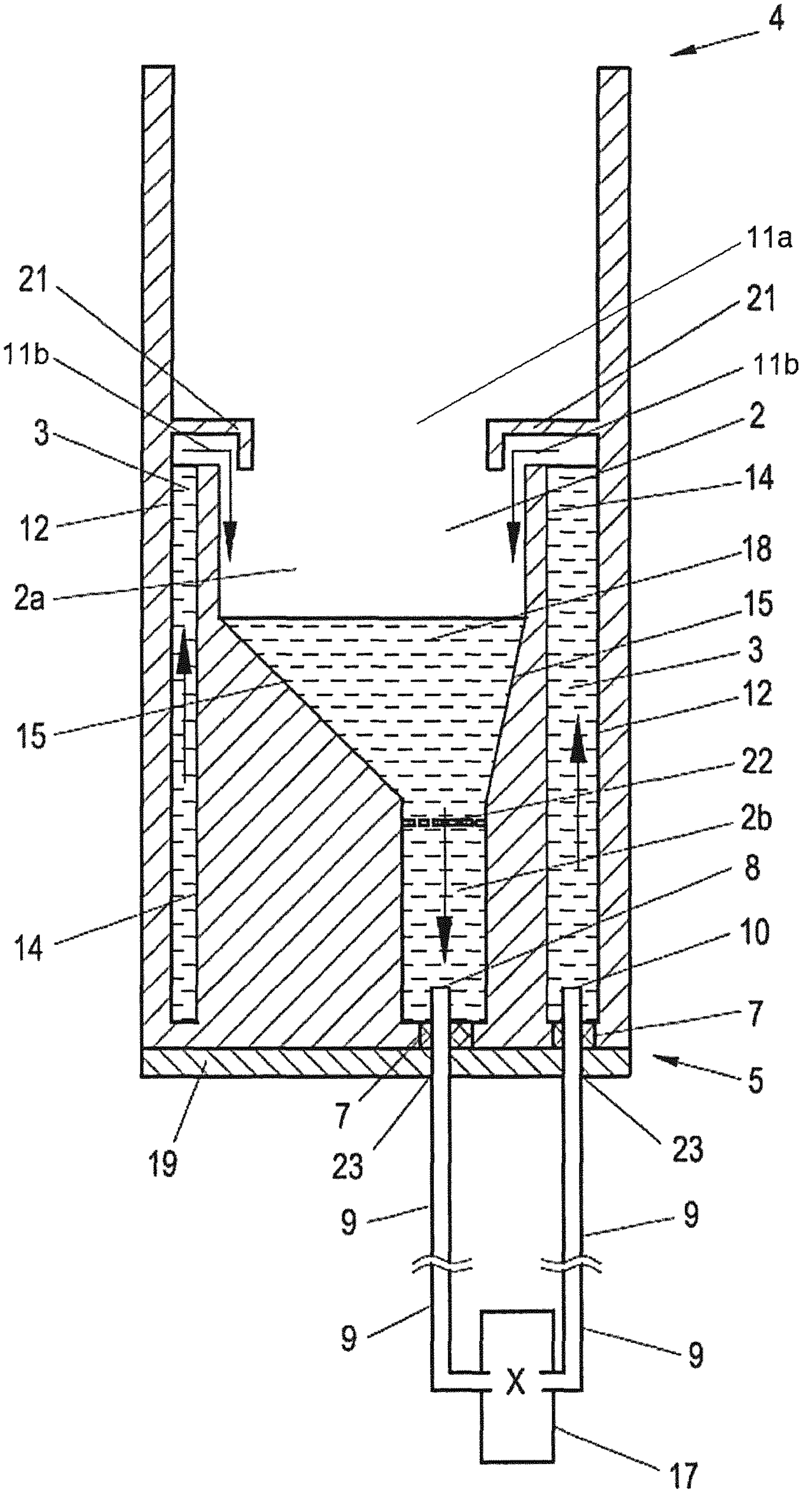
FIG. 2 is a longitudinal cross section of a container according to the present invention comprising an interface according to the present invention.

FIG. 2 is a longitudinal cross section of another embodiment of a container 1 of the present invention. In the embodiment of a container 1 according to the present invention shown in FIG. 2, it is considered that the inlet chamber 2 is surrounded by the outlet chamber 3. In this embodiment, the inlet chamber 2 is formed by the inner wall of the inlet chamber 15 and part of the bottom end 5 of the container 1 comprising an access region 7. The outlet chamber 3 is formed by the inner wall of the outlet chamber 13, the outer wall of the outlet chamber 12 and part of the bottom 5 of the container 1 comprising an access region 7. In such an embodiment, the outer wall of the inlet chamber 14 may be the same wall as the inner wall of the outlet chamber 13, as exemplarily shown in FIG. 2.

The container 1 schematically shown in FIG. 2 further comprises a filter element 22, which filter element 22 separates the inlet chamber 2 into a first inlet sub-chamber 2*a* and a second inlet sub-chamber 2*b*. Hereby, particles that might be comprised in a sample fluid 18 can be caught by the filter element 22 and retained in the first inlet sub-chamber 2*a*, thus preventing eventual entry of such particles into the flowpath 9 or even clogging of the flowpath by such particles. The container 1 shown in FIG. 2. comprises two separate access regions 7, one access region 7 to be used for connecting the inlet chamber 2, in particular for connecting the second inlet sub-chamber 2*b* with the first free end 8 of the flowpath 9, and another access region 7 to be used for connecting the outlet chamber 3 with the second free end 10 of the flowpath 9.

For stabilization of the bottom end 5 of the container 1 comprising the at least one access region 7, the container 1 shown in FIG. 2 further comprises a bottom element 19, which bottom element comprises passage ways 23 that allow establishing connections between the first free end 8 with the inlet chamber 2 and between the second free end 10 with the outlet chamber 3.

Additionally, the schematic container 1 shown in FIG. 2 further comprises a covering element 21 to provide protection of the outlet chamber 3 against spillage while still retaining an open top end 11*b* of the outlet chamber 3 to allow a flow of sample liquid 18 from the outlet chamber 3 to the inlet chamber 2. It is considered that the covering element 21 might also be provided in a tilted orientation provided in a way to guide a sample liquid 18 being introduced into such a container 1 directly to the inlet chamber 2.

Figure 3:
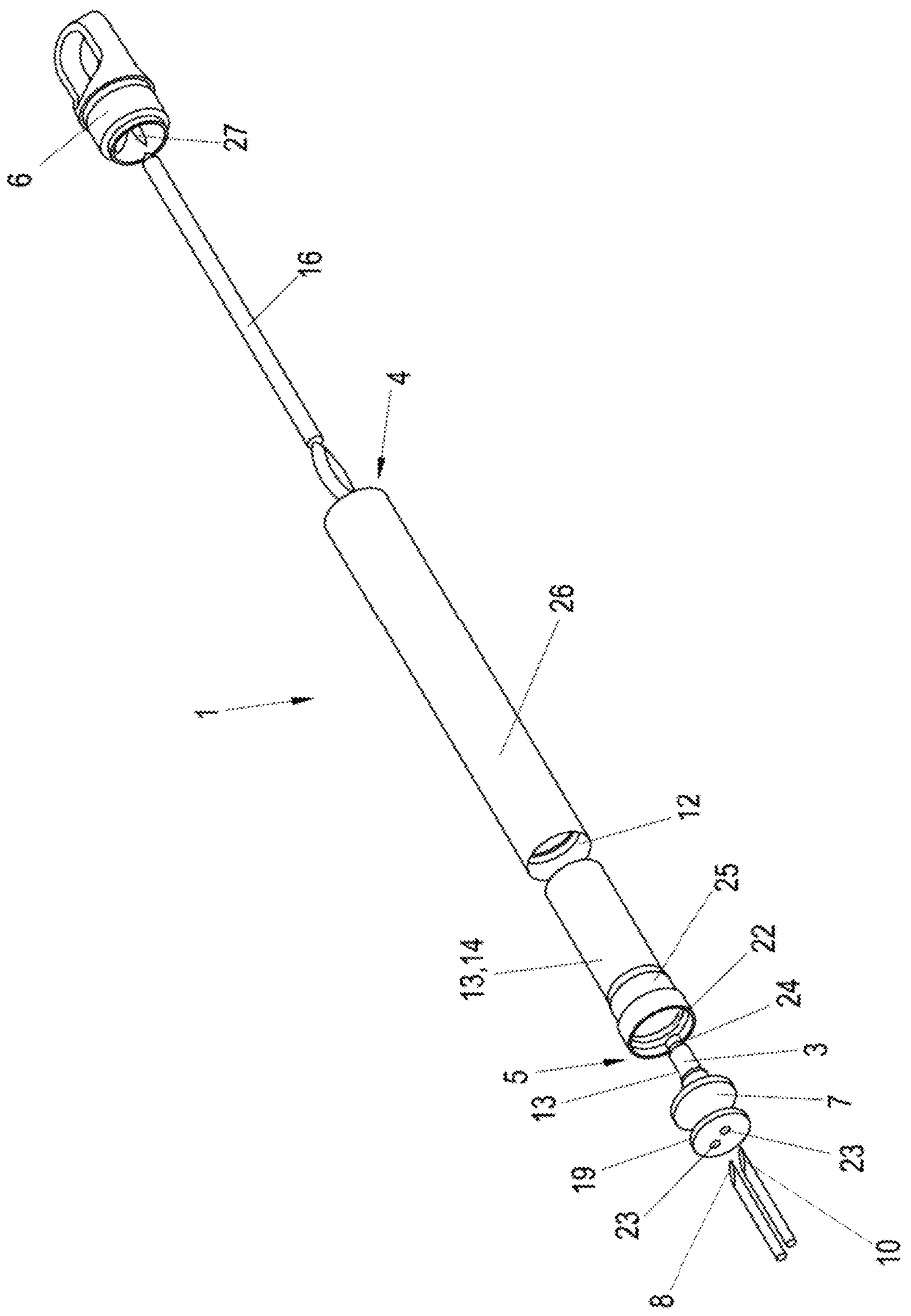
FIG. 3 is an exploded view of a container according to the present invention and a swab stick.

Referring to FIG. 3, an exploded view of yet another embodiment of a container 1 according to the present invention is shown. Therein, the access region 7 is a septum and the first free end 8 of the flowpath 9 and the other free end 10 of the flowpath 9 are hollow needles. In such an embodiment, the inlet chamber 2 and the outlet chamber 3 are created by combining three tube structures 24-26, wherein a first tube structure 24 comprises a filter element 22 and part of an access region 7 and wherein this first tube structure defines the second inlet sub-chamber 2*b*; wherein a second tube structure 25 surrounds the first tube structure 24 and wherein the second tube structure 25 comprises the first inlet sub-chamber 2*a*; and wherein a third tube structure 26 surrounds both the first tube structure 24 and the second tube structure 25, and wherein the third tube structure 26 comprises at least a part of the outlet chamber 3. It is considered, that the outlet chamber 3 may be provided as two outlet sub-chambers, wherein a first outlet sub-chamber is provided next to the second inlet sub-chamber 2*b* and surrounded by the second tube structure 25, and wherein a second outlet sub-chamber is provided e.g. by connection of the second tube structure 25 with the third tube structure 26, wherein the first outlet sub-chamber and the second outlet sub-chamber are in fluid connection with one another, and wherein the second outlet sub-chamber is in fluid connection with the inlet chamber 2 via the open top end (11*b*) of the second outlet sub-chamber. A sample liquid 18 transported via the second free end 10 of the flowpath 9 into the first outlet sub-chamber can by further transported into the second outlet-chamber and then recirculated into the inlet chamber 2 via the open top end (11*b*) of the second outlet sub-chamber.

Also shown in FIG. 3 is a swab stick 16 that may be accommodated in the inlet chamber 2, in particular in the first inlet sub-chamber 2*a*. The swab stick 16 can be fixated in a fixating structure 27 comprised by the detachable lid element 6. With such an embodiment of the present invention, the most important components for surface hygiene monitoring, a swab stick for taking a sample and a container for containing the sample until analysis, can be provided in a convenient and practical format.

The invention claimed is:

1. A container for small liquid volumes, the container comprising:

an inlet chamber adapted to accommodate a swab stick therein, an outlet chamber, an open top end which is optionally provided with a detachable lid element, a bottom end which comprises an access member which closes the bottom end, and a flowpath conduit connecting the inlet chamber and the outlet chamber via the access member, wherein each of the inlet and outlet chambers includes an open upper end that allows excess liquid introduced into the outlet chamber to flow into the inlet chamber, and wherein each of the inlet and outlet chambers includes respective inner and outer walls such that the inlet chamber is at least partly surrounded by the outlet chamber, and wherein the inlet chamber is formed by the inner wall of the inlet chamber and at least a part of the access member at the bottom end of the container, and the outlet chamber is formed by the inner wall of the outlet chamber and at least a part of both the outer wall of the outlet chamber and the access member at the bottom end of the container.

2. The container according to claim 1, wherein the outlet chamber defines a volume that is smaller than a volume defined by the inlet chamber.

3. The container according to any claim 1, wherein the access member includes at least one septum.

4. A kit comprising the container according to claim 1, and an analysis unit, wherein the flowpath conduit is adapted to establish a fluid connection between the analysis unit and the inlet and outlet chambers.

5. The kit according to claim 4, wherein the the flowpath conduit comprises first and second hollow needles adapted to being inserted through the access member to thereby establish fluid connection with the outlet and inlet chambers, respectively, and establishing a flow path between the outlet and inlet chambers and the analysis unit.

6. The kit according to claim 4, wherein the analysis unit comprises a flow cell.

7. A method for analyzing a sample liquid in at least one analysis unit; the method comprising the steps of:

a) providing the container for small liquid volumes according to claim 1 with a sample liquid contained in at least the inlet chamber thereof;

b) interconnecting the container with an analysis unit via the flowpath conduit;

c) transporting the sample liquid from the inlet chamber through the flowpath conduit to the analysis unit;

d) performing at least one analysis of the sample liquid in the analysis unit;

e) transporting the sample liquid from the analysis unit through the flowpath conduit to the outlet chamber;

f) optionally, recirculating the sample liquid from the outlet chamber to the inlet chamber and repeating the previous steps; and g) returning at least one result from the analysis of the sample liquid by the analysis unit.

8. The method according to claim 7, further comprising the steps of:

h) transporting the sample liquid from the outlet chamber through the flowpath conduit to the inlet chamber; and i) transporting a gas from the outlet chamber through the flowpath conduit to the inlet chamber, thereby displacing the sample liquid from the flowpath conduit with the gas.

9. The method according to claim 7, wherein the outlet chamber defines a volume that is smaller than a volume defined by the inlet chamber.

10. The method according to claim 7, wherein the flowpath conduit comprises a first hollow needle at one end and a second hollow needle at another end; and wherein the access member includes at least one septum, and wherein step b) comprises:

b1) accessing the inlet chamber by insertion of the first hollow needle through the at least one septum; and b2) accessing the outlet chamber by inserting the second hollow needle through the at least one septum.

11. A system to analyze a sample liquid comprising:

(i) a container for containing a volume of sample liquid for analysis, (ii) an analysis system for analyzing the sample liquid, and (iii) a fluid connection system which establishes a fluid connection between the container and the analysis system, wherein the container comprises:

an inlet chamber adapted to accommodate a swab stick therein, the inlet chamber containing a volume of the sample liquid for analysis, an outlet chamber, an open top end which is optionally provided with a detachable lid element, and a bottom end which comprises an access member which closes the bottom end, wherein each of the inlet and outlet chambers includes an open upper end that allows excess liquid introduced into the outlet chamber to flow into the inlet chamber, and wherein the fluid connection system includes a flowpath conduit wherein the flowpath conduit includes first and second free ends defining a flowpath for a liquid, wherein the first and second free ends are insertable through the access member so as to continually remove a quantity of the sample liquid from the inlet chamber and deliver the quantity of the sample liquid to the analysis system for analysis thereby, and to thereafter continually introduce the quantity of the liquid into the outlet chamber of the container following analysis by the analysis system.

12. The system according to claim 11, wherein the inlet chamber is formed by an inner wall of the inlet chamber and at least a part of the access member at the bottom end of the container, and the outlet chamber is formed by an inner wall of the outlet chamber and at least a part of both the outer wall of the outlet chamber and the access member at the bottom end of the container.

13. The system according to claim 11, wherein the flowpath conduit further comprises a second container that is a part of the flowpath defined by the first and second free ends.

14. The system according to claim 11, wherein the analysis system comprises at least one analysis unit positioned in the second container.

15. The system according to claim 14, wherein the analysis system comprises a plurality of analysis units positioned in the second container that are connected serially and/or in parallel along the flow path.

16. The system according to claim 14, wherein the at least one analysis unit comprises a flow cell.

* * * * *